(12) United States Patent
Kanie

(10) Patent No.: US 10,113,577 B2
(45) Date of Patent: Oct. 30, 2018

(54) LOCKING PIN AND GROMMET FASTENER ASSEMBLY

(71) Applicant: ILLINOIS TOOL WORKS INC., Glenview, IL (US)

(72) Inventor: Hideki Kanie, Aichi (JP)

(73) Assignee: Illinois Tool Works Inc., Glenview, IL (US)

( * ) Notice: Subject to any disclaimer, the term of this patent is extended or adjusted under 35 U.S.C. 154(b) by 211 days.

(21) Appl. No.: 15/037,115

(22) PCT Filed: Aug. 27, 2014

(86) PCT No.: PCT/US2014/053025
§ 371 (c)(1),
(2) Date: May 17, 2016

(87) PCT Pub. No.: WO2015/076892
PCT Pub. Date: May 28, 2015

(65) Prior Publication Data
US 2016/0298668 A1  Oct. 13, 2016

Related U.S. Application Data

(60) Provisional application No. 61/907,646, filed on Nov. 22, 2013.

(51) Int. Cl.
*F16B 19/10* (2006.01)
*F16B 21/07* (2006.01)
(Continued)

(52) U.S. Cl.
CPC ........ *F16B 21/076* (2013.01); *B60R 13/0206* (2013.01); *F16B 5/0628* (2013.01);
(Continued)

(58) Field of Classification Search
CPC .................................................. F16B 19/1081
(Continued)

(56) References Cited

U.S. PATENT DOCUMENTS 4,571,134 A * 2/1986 Beglinger ........... F16B 19/1081
411/41
5,286,152 A  2/1994 Anderson
(Continued)

FOREIGN PATENT DOCUMENTS

CN  102667183 A  9/2012
WO  WO 2014/072080 A1 * 5/2014

OTHER PUBLICATIONS

ISR and WO for PCT/US2014/053025 dated Nov. 14, 2014.

*Primary Examiner* — Flemming Saether
(74) *Attorney, Agent, or Firm* — Joseph M. Butscher; The Small Patent Law Group, LLC

(57) ABSTRACT

A fastener assembly, which may be configured to be removably secured within an opening of a component, may include a pin including a plurality of locking members, and a grommet including a plurality of reciprocal retaining features configured to snapably retain the plurality of the locking members in a locked state in which the fastener assembly is configured to be inserted into the opening of the component. The plurality of locking members are removed from the reciprocal retaining features in a securing state in which the fastener assembly is secured within the opening formed through the component.

20 Claims, 4 Drawing Sheets

(51) Int. Cl.
*B60R 13/02* (2006.01)
*F16B 5/06* (2006.01)

(52) U.S. Cl.
CPC .......... *F16B 19/1081* (2013.01); *F16B 21/07* (2013.01); *B60R 13/025* (2013.01)

(58) Field of Classification Search
USPC .................................................. 411/45–84
See application file for complete search history.

(56) References Cited

U.S. PATENT DOCUMENTS

| | | | |
|---|---|---|---|
| 5,632,581 A | 5/1997 | Hasada | |
| 5,775,860 A * | 7/1998 | Meyer | F16B 19/1081 411/41 |
| 6,415,478 B1 * | 7/2002 | Watanabe | B60N 3/026 16/383 |
| 6,481,942 B2 * | 11/2002 | Tanaka | F16B 19/1081 411/41 |
| 6,769,849 B2 * | 8/2004 | Yoneoka | F16B 5/0642 411/41 |
| 6,874,983 B2 * | 4/2005 | Moerke | F16B 19/1081 24/297 |
| 6,910,840 B2 * | 6/2005 | Anscher | F16B 19/1081 411/41 |
| 7,607,875 B2 | 10/2009 | Shinozaki et al. | |
| 9,181,968 B2 * | 11/2015 | Handa | F16B 19/10 |
| 2002/0001513 A1 | 1/2002 | Tanaka | |
| 2007/0003390 A1 * | 1/2007 | Kawai | B60R 21/213 411/48 |
| 2012/0291240 A1 | 11/2012 | Suzuki | |

\* cited by examiner

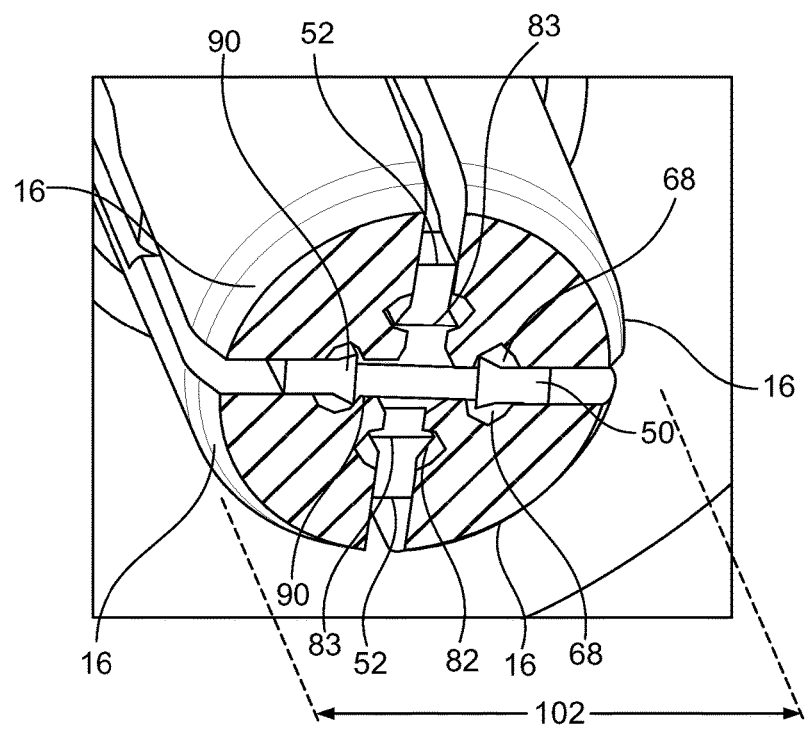
FIG. 8
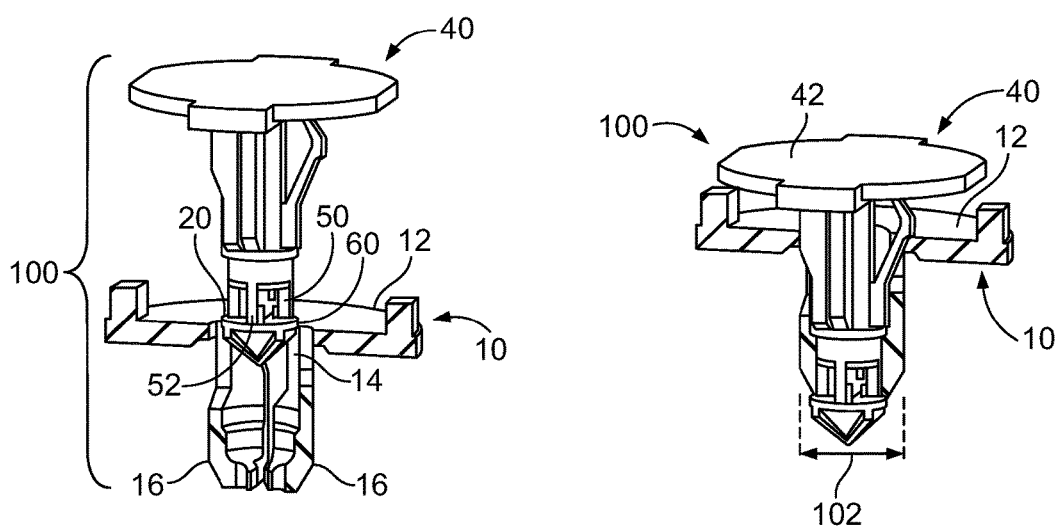
FIG. 9  FIG. 10

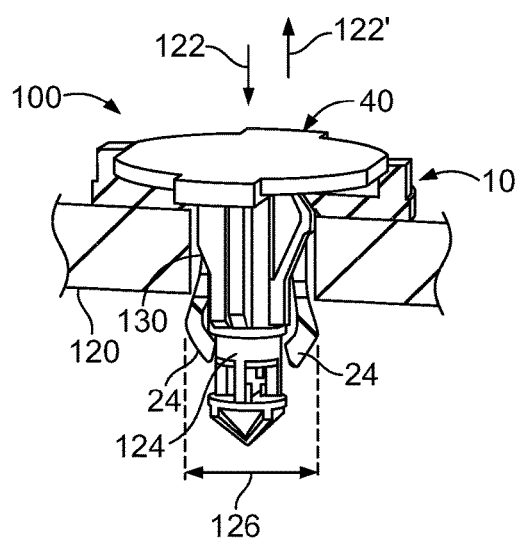
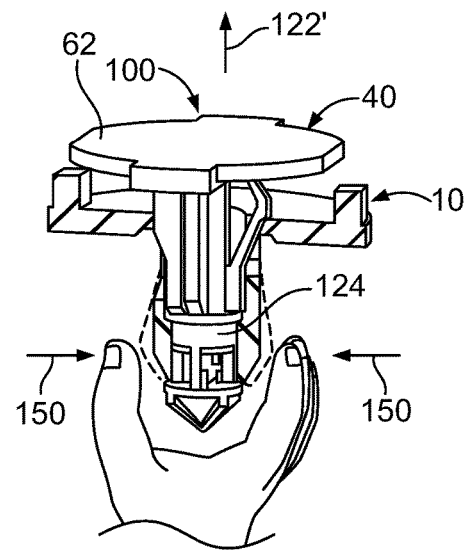
FIG. 11
FIG. 12
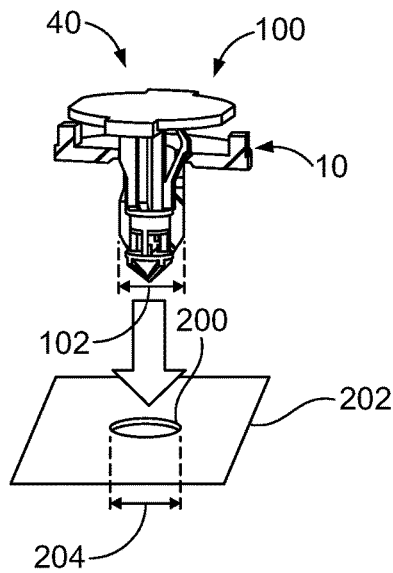
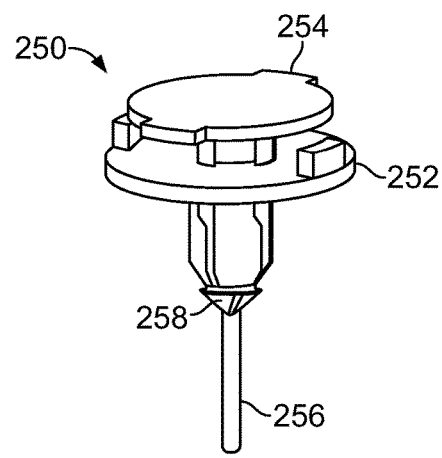
FIG. 13
FIG. 14

LOCKING PIN AND GROMMET FASTENER ASSEMBLY

RELATED APPLICATIONS

This application is National Phase of International Application No. PCT/US2014/053025, filed Aug. 27, 2014, and relates to and claims priority benefits from U.S. Provisional Patent Application No. 61/907,646, filed Nov. 22, 2013, which is hereby incorporated by reference in its entirety.

FIELD OF EMBODIMENTS OF THE DISCLOSURE

Embodiments of the present disclosure generally relate to fastener assemblies, and more particularly to locking pin and grommet fastener assemblies configured to secure components together.

BACKGROUND

Fasteners may be used to secure components together. For example, a fastener may be used to securely connect a first panel to a second panel. Cover panels, such as B-pillar appliqués, may be secured to door frames or panels of automobiles through one or more fasteners.

In order to secure the first panel to the second panel, a pin and grommet fastener may be used. A top, planar portion of the pin may be adhesively secured to the first panel, for example, while the grommet may be snapably secured within a hole formed in the second panel. Typically, the grommet includes a passage that allows the pin to pass through during a mating process. The hole typically conforms to the shape of the pin shaft when the pin is secured with respect to the grommet.

One known fastener includes a grommet having four legs that spread apart when a pin is driven within a passage of the grommet. The pin and grommet are configured to be reused. In order to remove the pin, the pin may be ejected a short distance, such as 6-10 mm, with respect to the grommet. The pin may include a latch that prevents it from fully dislodging from the grommet. With the pin heading extending above the grommet, the pin may be grasped and pulled out of the grommet. The pin may be removed from the grommet for servicing of the pin, grommet, and/or the components configured to be secured together by the pin and grommet.

With repeated use, however, the legs may progressively spread out when the pin is removed from the grommet. For example, over time, the legs tend to set in an outwardly bent position. In general, the legs do not retract after they expand, because when the pin is inserted into the grommet, the legs spread out to clamp into a component. The legs may then set over time. The legs may be inwardly squeezed to remove the grommet from an opening within a component. However, after the compressive, squeezing force is released, the legs may spread back open. As such, when an individual attempts to re-insert the pin and grommet back into a component, the spread legs may abut or snag into an edge of a retaining hole or channel within the component, thereby hindering or even preventing re-insertion.

SUMMARY OF EMBODIMENTS OF THE DISCLOSURE

Certain embodiments of the present disclosure provide a fastener assembly that may include a pin including at least one locking member or at least one reciprocal retaining feature, and a grommet including the other of the at least one locking member or the at least one reciprocal retaining feature. The locking member(s) may be configured to be securely retained by the reciprocal retaining feature(s) in a compact locked state in which the fastener assembly is configured to be inserted into an opening formed through a component. The locking member(s) is removed from the reciprocal retaining feature(s) in an expanded securing state in which the fastener assembly is secured within the opening formed through the component.

The locking member(s) may include at least one locking protuberance extending from a planar wall. The locking member(s) may include a column having at least one projection. An axial cross-section of the column may be T-shaped, for example. The reciprocal retaining feature(s) may include at least one notch, groove, or channel that is configured to snapably retain the locking member(s).

In at least one embodiment, the grommet may include a plurality of securing legs configured to outwardly expand in the securing state and pinch together in the locked state. Each of the securing legs may include the locking member(s) or the reciprocal retaining feature(s).

In at least one embodiment, the pin may include the locking member(s) extending from a wall. The locking member(s) may include at least one first locking protuberance and at least one second locking protuberance. The first locking protuberance(s) may be positioned to a first side of a central diametric plane of the pin, and the second locking protuberance(s) may be positioned to a second side of the central diametric plane of the pin. The first side may be opposite the second side. At least a portion of the first locking protuberance(s) may be positioned at a different level than an entirety of the second locking protuberance(s).

Certain embodiments of the present disclosure provide a fastener assembly configured to be removably secured within an opening of a component. The fastener assembly may include a pin including a plurality of locking members, and a grommet including a plurality of reciprocal retaining features configured to snapably retain the plurality of the locking members in a compact locked state in which the fastener assembly is configured to be inserted into the opening of the component. The plurality of locking members are removed from the reciprocal retaining features in an expanded securing state in which the fastener assembly is secured within the opening formed through the component.

BRIEF DESCRIPTION OF SEVERAL VIEWS OF THE DRAWINGS

FIG. 8 illustrates a partial cross-sectional view of a fastener assembly through line 8-8 of FIG. 5, according to an embodiment of the present disclosure.

FIG. 9 illustrates a perspective front view of a fastener assembly as initially formed, according to an embodiment of the present disclosure.

FIG. 10 illustrates a perspective front view of a fastener assembly in a locked state, according to an embodiment of the present disclosure.

FIG. 11 illustrates a perspective front view of a fastener assembly securely connected to a panel, according to an embodiment of the present disclosure.

FIG. 12 illustrates a perspective front view of a fastener assembly with securing legs of a grommet being locked to a pin, according to an embodiment of the present disclosure.

FIG. 13 illustrates a perspective front view of a fastener assembly being inserted into an opening of a panel, according to an embodiment of the present disclosure.

FIG. 14 illustrates a perspective view of a fastener assembly, according to an embodiment of the present disclosure.

Figure 1:
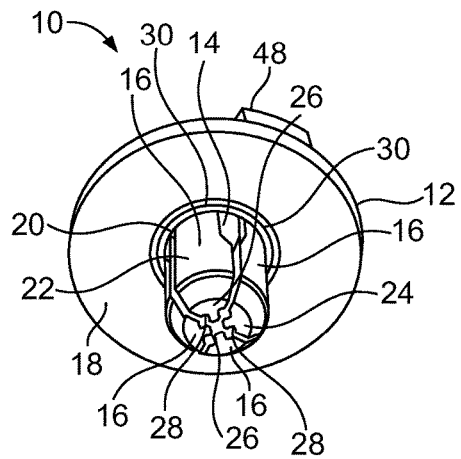
FIG. 1 illustrates a perspective bottom view of a grommet, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates a perspective bottom view of a grommet or main body 10, according to an embodiment of the present disclosure. The grommet 10 may be integrally molded and formed as a single piece of material, such as injection-molded plastic. The grommet 10 may include an annular collar 12 that radially extends about a central passage 14. Securing legs 16 downwardly extend from a lower surface 18 of the collar 12 proximate to an internal edge 20 that defines the central passage 14. As shown in FIG. 1, the grommet 10 may include four regularly-spaced securing legs 16. Alternatively, the grommet 10 may include more or less securing legs 16 than shown.

Each securing leg 16 may include an extension beam 22 and an inwardly-canted tip 24 extending from the extension beam 22. As shown, each canted tip 24 may include an inwardly directed fin or tab 26 and a notch 28 on either side of the fin or tab 26.

In operation, the securing legs 16 are configured to outwardly pivot about joints 30 that connect to the collar 12 as a mating pin is moved into the central passage 14. The securing legs 16 pivot to outwardly expand in order to secure the grommet 10 into an opening of a component, such as a panel.

Figure 2:
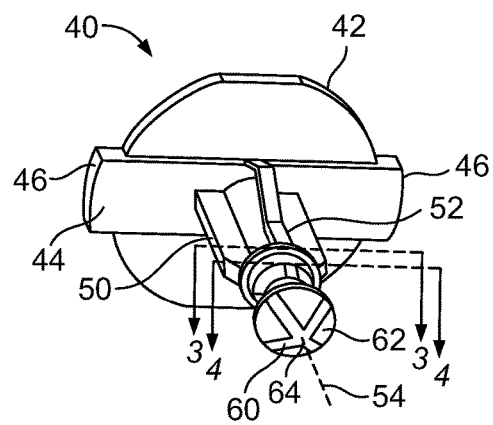
FIG. 2 illustrates a perspective bottom view of a pin, according to an embodiment of the present disclosure.

FIG. 2 illustrates a perspective bottom view of a pin 40, according to an embodiment of the present disclosure. The pin 40 may be integrally molded and formed as a single piece of material, such as injection-molded plastic. The pin 40 may include an upper cap 42 and a linear beam 44 extending through a diameter of the cap 42. In a fully-mated position with respect to the grommet 10 (shown in FIG. 1), a lower surface of the cap 42 may seat over an upper surface of the collar 12. Terminal ends 46 of the linear beam 44 may be grasped by a user to pull the pin 40 up from the grommet 10. The grommet 10 may also include graspable tabs 48 (shown in FIG. 1) that upwardly extend from the collar 12.

A planar wall 50 extends downwardly from a lower surface of the linear beam 44, and is generally parallel with the linear beam 44. Opposed columns 52 also extend downwardly from the linear beam 44 with respect to either side of the wall 50. For example, two columns 52 may be spaced apart from the wall 50 about a central longitudinal axis 54 of the pin 40. The columns 52 may be perpendicular to the wall 50.

Alternatively, the pin 40 may not include the linear beam 44. Instead, the wall 50 and the columns 52 may downwardly extend from a lower surface of the cap 42.

A driving head 60 may extend downwardly from one or both of the wall 50 and/or the columns 52. The driving head 60 may include a beveled end 62 that bevels to an apex 64. The driving head 60 is configured to be driven into the central passage 14 of the grommet 10 (shown in FIG. 1) to spread the securing legs 16 apart.

Figure 3:
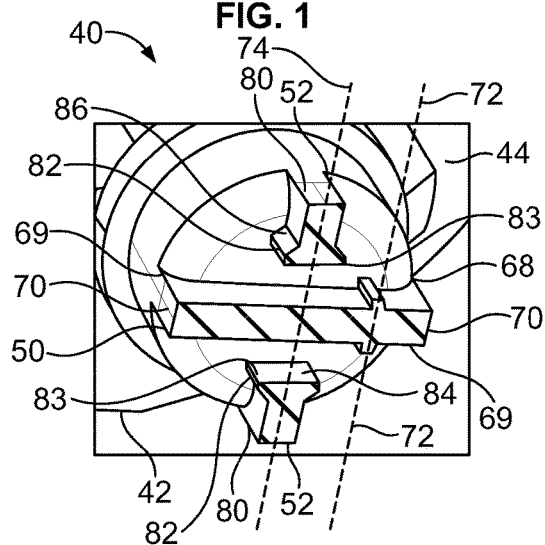
FIG. 3 illustrates a partial cross-sectional view of a pin through line 3-3 of FIG. 2, according to an embodiment of the present disclosure.

FIG. 3 illustrates a partial cross-sectional view of the pin 40 through line 3-3 of FIG. 2, according to an embodiment of the present disclosure. As shown, the wall 50 may be or include a planar member, such as a tab, beam, or the like, having opposed sides 69 integrally connected to opposed ends 70. A locking protuberance 68 may outwardly extend from each side 69. The locking protuberances 68 may be aligned with one another in relation to a plane 72 that is parallel with a central diametric plane 74 of the pin 40. As shown, the locking protuberances 68 may be offset to a side of the central diametric plane 74. Alternatively, the locking protuberances 68 may be positioned at various other locations on the wall 50. For example, the locking protuberances 68 may not be aligned with respect to the plane 72. Instead, one locking protuberance 68 may be to one side of the central diametric plane 74, while another locking protuberance 68 may be on an opposite side with respect to the central diametric plane 74. Also, alternatively, more or less locking protuberances 68 than shown may be used. For example, two additional locking protuberances 68 may outwardly extend from the wall 50 with respect to another plane that is positioned to an opposite side of the central diametric plane 74.

As shown, the columns 52 are spaced from the wall 50 and may be aligned with respect to the central diametric plane 74. Each column 52 may include a downwardly extending beam 80 having an expanded internal end 82 that is proximate to the wall 50. The expanded internal end 82 may include a flat internal beam 84 that is generally perpendicular to the beam 80. Terminal ends or projections 83 of the internal beam 84 may connect to lateral surfaces of the beam 80 through angled portions 86. As shown, the axial cross-section of the columns 52 may resemble a T-shape, or top hat, for example. Each terminal end or projection 83 is configured to be securely retained within a reciprocal feature of a securing leg 16 (shown in FIG. 1) of the grommet 10 in a compact locked state.

Figure 4:
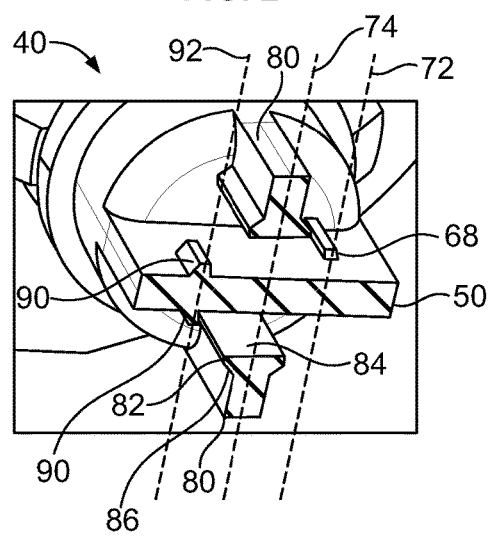
FIG. 4 illustrates a partial cross-sectional view of a pin through line 4-4 of FIG. 2, according to an embodiment of the present disclosure.

FIG. 4 illustrates a partial cross-sectional view of the pin 40 through line 4-4 of FIG. 2, according to an embodiment of the present disclosure. As shown, locking protuberances 90 may outwardly extend from the wall 50 and be aligned with a plane 92 that is parallel to the central diametric plane 74 and the plane 72, but on an opposite side of the central diametric plane 74 than the plane 72. As shown, the locking protuberances 90 may extend from the wall 50 at a lower depth than the locking protuberances 68. The different depths or levels of the locking protuberances 68 and 90 may provide a more stable, locking relationship with the grommet 10. Alternatively, the locking protuberances 68 and 90 may be at the same depth, level, height, or the like.

Figure 5:
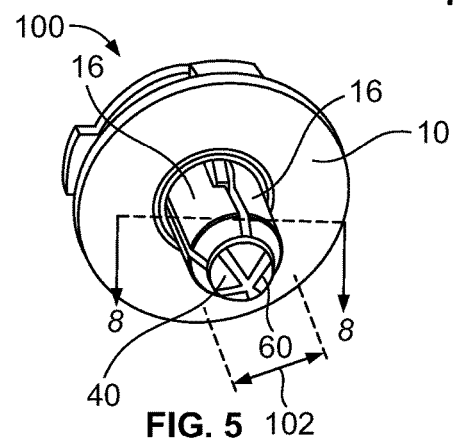
FIG. 5 illustrates a perspective bottom view of a fastener assembly, according to an embodiment of the present disclosure.

FIG. 5 illustrates a perspective bottom view of a fastener assembly 100, according to an embodiment of the present disclosure. The fastener assembly 100 may include the grommet 10 and the pin 40. As shown in FIG. 5, the fastener assembly 100 is in a locked state in which the securing legs 16 of the grommet 10 are securely locked to the wall 50 and the columns 52 (shown in FIGS. 3 and 4) in order to minimize or otherwise reduce the axial envelope or diameter 102 of the cooperating securing legs 16 (for example, the combined axial envelope or diameter of all four securing legs 16) so that they may easily pass into an opening of a component, such as a panel. The driving head 60 is shown extending out of the central passage defined between the securing legs 16 past the distal ends of the securing legs 16.

Figure 6:
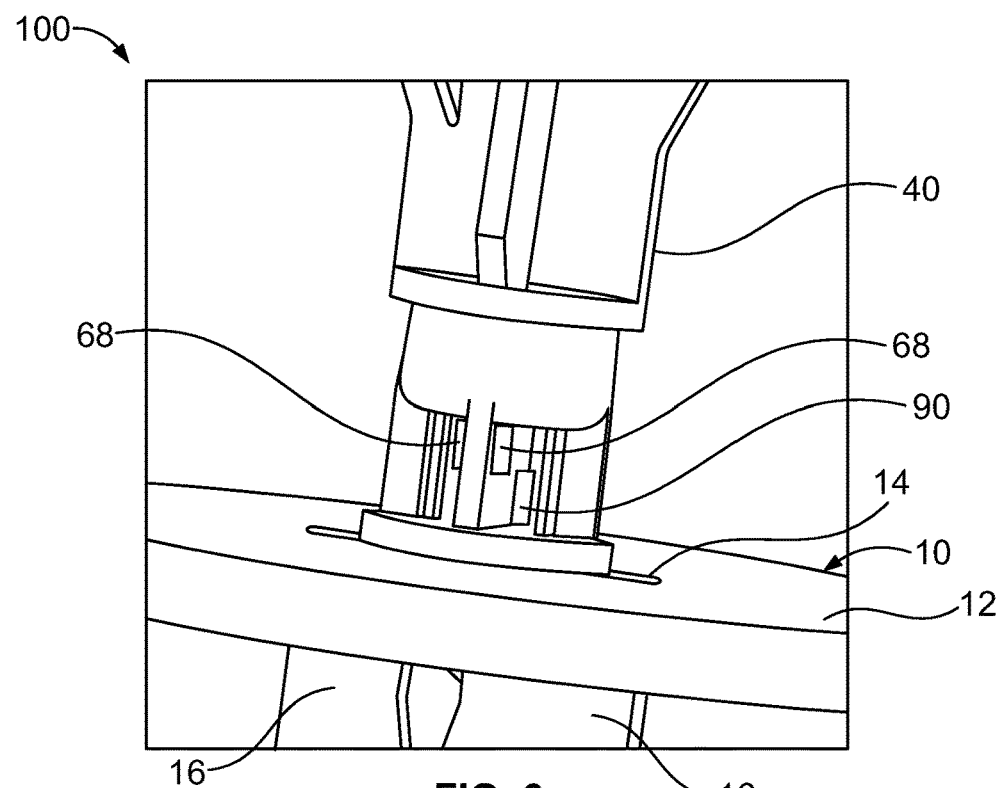
FIG. 6 illustrates a perspective view of a pin being inserted into a central passage of a grommet, according to an embodiment of the present disclosure.

FIG. 6 illustrates a perspective view of the pin 40 being inserted into the central passage 14 of the grommet 10, according to an embodiment of the present disclosure. As shown, the locking protuberances 68 may be positioned at a level that is above the locking protuberances 90. Each locking protuberance 68 and 90 may be shaped and sized to securely mate with a reciprocal feature formed on and/or in a securing leg 16 of the grommet 10. For example, each locking protuberance 68 and 90 may be shaped as a planar tab, which may or may not include ramped surfaces or the like. The locking protuberances 68 and 90 are configured to snapably mate with reciprocal features of the securing legs 16 to securely lock the securing legs 16 to the pin 40. In this manner, the securing legs 16 stay close to the pin 40 so that the securing legs 16 may quickly and easily pass into an opening of a component, thereby allowing the fastener assembly 10 to be quickly and easily inserted and/or reinserted into the opening or another opening of another component. Even if the securing legs 16 are otherwise set in a flared position, the securing legs 16 may be urged into a secure connection with the pin 40 (such as through squeezing the securing legs 16 into snapable engagement with the pin 40) to temporarily prevent the securing legs 16 from outwardly flaring.

Figure 7:
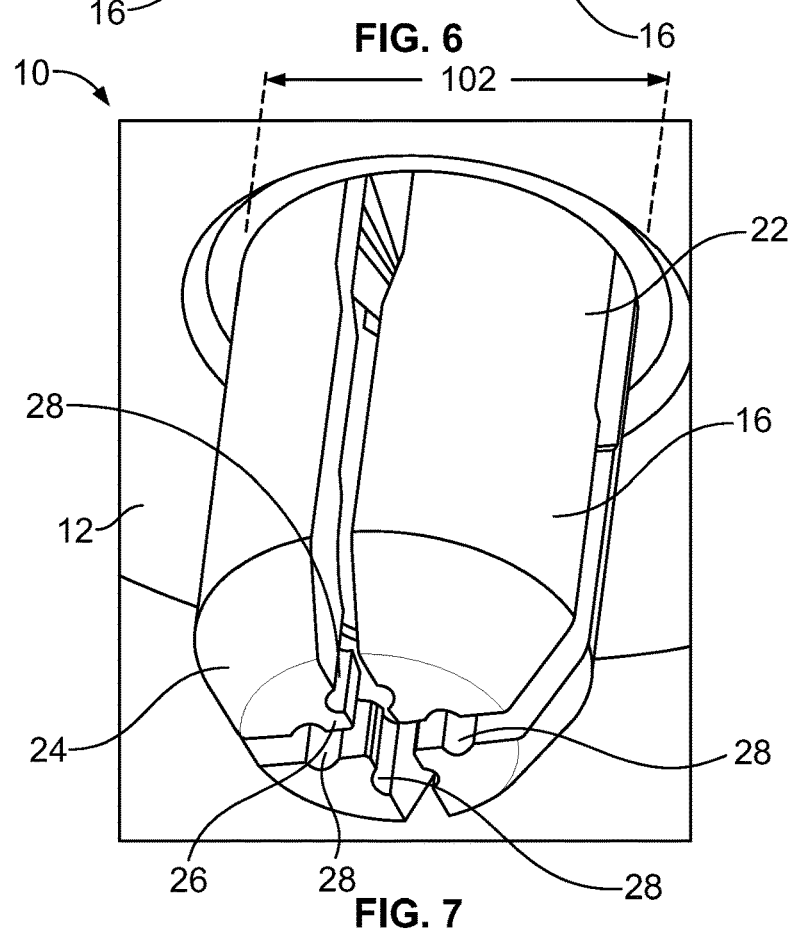
FIG. 7 illustrates a perspective bottom view of securing legs of a grommet, according to an embodiment of the present disclosure.

FIG. 7 illustrates a perspective bottom view of the securing legs 16 of the grommet 10, according to an embodiment of the present disclosure. As noted above, each securing leg 16 may include an extension beam 22 and an inwardly-canted tip 24. As shown, each canted tip 24 may include an inwardly directed fin or tab 26 with a notch 28 on either side thereof. Each notch 28 is configured to be sized and shaped to snapably retain a locking member of the pin 40, such as one of the locking protuberances 68 or 90, or a terminal end or projection 83. Thus, when a notch 28 is at the same level as a locking protuberance 68 or 90, the notch 28 snapably secures to the respective locking protuberance 68 or 90 when the securing leg 16 is forced inwardly toward the pin 40 (for example, when an individual inwardly squeezes or pinches the securing legs 16). As such, the securing legs 16 may securely lock to the pin 40 in order to minimize or otherwise reduce the axial envelope 102 of the securing legs 16.

FIG. 8 illustrates a partial cross-sectional view of the fastener assembly 100 through line 8-8 of FIG. 5, according to an embodiment of the present disclosure. As shown, the securing protuberances 68 and 90 are snapably secured within reciprocal notches 28 formed in the securing legs 16. Similarly, terminal ends or projections 83 of the expanded internal ends 82 of the columns 52 may also be snapably secured within reciprocal notches 28 formed in the securing legs 16. Thus, in order to minimize or otherwise reduce the axial envelope 102 of the securing legs 16, the securing legs 16 may be inwardly squeezed or pinched so that the notches 28 snapably secure to the locking protuberances 68 and/or 90 and/or the terminal ends of the expanded internal ends 82 of the columns 52 of the pin 40.

As shown in FIG. 8, at least portions of the locking protuberances 68 and 90 may be located at the same level, height, depth, or the like. While the locking protuberances 68 may extend to a level above the locking protuberances 90, at least portions of the locking protuberances 68 and 90 snapably secure to reciprocal features of the securing legs 16 at the same height. Alternatively, the entireties of the locking protuberances 68 and 90 may securely mate with reciprocal features of the securing legs 16 at the same or different levels, heights, depths, or the like.

FIG. 9 illustrates a perspective front view of a fastener assembly 100 as initially formed, according to an embodiment of the present disclosure. For the sake of clarity, not all of the securing legs 16 of the grommet 10 are shown, so that the internal mating of the columns 52 and the wall 50 with the securing legs 16 may be shown.

The fastener assembly 100 may be integrally molded and formed as a single piece. For example, an outer perimeter portion of the driving head 60 may be integrally connected to the internal edge 20 of the grommet 10 that defines the central passage 14 through a flash connection or joint. After the fastener assembly 100 has been integrally formed and molded, the pin 40 may be driven into the central passage 14 of the grommet 10 toward a locked state, thereby breaking the flash connection or joint.

FIG. 10 illustrates a perspective front view of the fastener assembly 100 in the locked state, according to an embodiment of the present disclosure. In the locked state, the cap 42 of the pin 40 may be separated from an upper surface of the annular collar 12 of the grommet 10. In this position, the locking protuberances 68 and 90 and the terminal ends or projections 83 of the expanded internal ends 82 of the columns 52 of the pin 40 are snapably secured to reciprocal features, such as the notches, grooves, channels, or the like 28 of the securing legs 16, as shown and described with respect to FIGS. 6-8, for example. In the locked state, locking members of the pin 40, such as the locking protuberances 68 and 90 and portions of the columns 52, are securely retained within and locked to reciprocal features of the securing legs 16 of the grommet 10, such as the reciprocal notches 28. In this manner, the axial envelope 102 of the securing legs 16 is minimized or otherwise reduced so that that fastener assembly 100 is in a compact state.

FIG. 11 illustrates a perspective front view of the fastener assembly 100 securely connected to a panel 120, according to an embodiment of the present disclosure. In order to secure the fastener assembly 100 to the panel 120, the cap 42 is urged downwardly toward the annular collar 12 in the direction of arrow 122 into an expanded securing state in which the fastener assembly 100 is securely connected to the panel 120. During the movement in the direction of arrow 122 into the securing state, the locking protuberances 68 and 90, as well as the portions of the columns 52, are moved out of engagement with the reciprocal features of the securing legs 16. For example, the locking members of the pin 40 are slid below the reciprocal features of the securing legs 16, thereby disengaging the locking members of the pin 40 from the reciprocal features. Further, during the movement in the direction of arrow A, the inwardly-canted tips 24 slide over a leg-spreading rim 124 of the pin 40, which spreads the securing legs 16 apart such that an expanded axial envelope 126 (of the cooperating securing legs 16) is greater than a diameter of an opening 130 of the panel 120. Therefore, the fastener assembly 100 is securely connected to the panel 120 such that the securing legs 16 are unable to retreat through the opening 130 in the direction of arrow 122'.

FIG. 12 illustrates a perspective front view of the fastener assembly 100 with the securing legs 16 of the grommet 10 being locked to the pin 40, according to an embodiment of the present disclosure. In order to remove the fastener assembly 100 from the panel 120, the cap 40 may be upwardly pulled in the direction of arrow 122'. During this movement, the securing legs 16 may flex back toward at-rest positions, as they no longer engage the leg-spreading rim 124. In order to lock the securing legs 16 to the pin 40, a user may pinch or squeeze the securing legs 16 inwardly in the direction of arrows 150. As the securing legs 16 are pressed inwardly, the locking members of the pin 40 snapably secure to reciprocal retaining features (such as the notches, grooves, channels, ridges, or the like 28) of the securing legs 16, thereby reducing the axial envelope 102 of the securing legs 16.

FIG. 13 illustrates a perspective front view of the fastener assembly 100 being inserted into an opening 200 of a panel 202 according to an embodiment of the present disclosure. In the compact locked state, the axial envelope 102 of the cooperating securing legs 16 is reduced to a point in which it is less than a diameter 204 of the opening 200. As such, the securing legs 16 may quickly and easily pass into the opening 200, without potentially snagging on portions of the panel 202.

FIG. 14 illustrates a perspective view of a fastener assembly 250, according to an embodiment of the present disclosure. The fastener assembly 250 may include a grommet 252 and pin 254, as described above. Additionally, the pin 254 may include an optional piloting guide 256 that extends downwardly from a driving head 258. The piloting guide 256 may be or include a longitudinal cylindrical post that may be secured to the pin 254 in order to align and guide the pin 254 with respect to the grommet 252. The piloting guide 256 may be broken off after the pin 254 is secured to the grommet 252. Alternatively, the piloting guide 256 may be configured to remain on the pin 254. The piloting guide 256 may be integrally molded and formed with the pin 254

Referring to FIGS. 1-14, embodiments of the present disclosure provide a fastener assembly that may include a pin and grommet. Securing legs of the grommet may securely connect to portions of the pin in a compact locked state. In the locked state, the axial envelope or diameter of the cooperating securing legs may be minimized or reduced. The axial envelope of diameter of the cooperating securing legs may be less than a diameter of an opening of a panel to which the fastener assembly is configured to connect. The securing legs may be inwardly squeezed to securely connect to locking members (such as locking protuberances, terminal ends of expanded portions of columns, and the like) of the pin.

Even if the securing legs tend to set in an outwardly bent or flared position over time, the securing legs may be securely connected to portions of the pin in a locked state, such as by squeezing the securing legs into a snapable engagement with portions of the pin. The securing legs may be prevented from spreading open in the locked state. Therefore, when an individual attempts to re-insert the fastener assembly into an opening of a component, such as a panel, the legs remain close to one another and are not susceptible to abutting into an edge of the component that defines the opening, such as a retaining hole or channel. Embodiments of the present disclosure provide a fastener assembly that may be locked so that it may be quickly and easily inserted into an opening of a component.

Embodiments of the present disclosure provide a fastener assembly in which one or more portions of the pin, such as at a distal end, may include one or more locking members, such as protrusions, protuberances, or the like, that are configured to lock into reciprocal features within the securing legs of the grommet or main body of the fastener assembly. If the securing legs of the grommet or main body outwardly flare, the securing legs may be squeezed or pinched inwardly to reset the securing legs with respect to the pin, so that the fastener assembly may be quickly and easily re-inserted into a channel, opening, or hole of a component. When the securing legs of the grommet are squeezed toward the pin, features on the securing legs mate with locking members on the pin in order to temporarily lock the securing legs to the pin.

As shown and described, the securing legs of the grommet may be configured to be compressed inwardly (such as through pressing, pushing, or the like) and locked to the pin to allow for quick and easy insertion and re-insertion into an opening of a component, such as a panel.

Alternatively, the grommet may include the locking members shown and described with respect to the pin, while the pin may include the reciprocal retaining features shown with respect to the grommet. Further, more or less locking members and retaining features than shown may be used.

Unlike known fasteners, embodiments of the present disclosure provide a fastener assembly including a pin that allows the securing legs of a grommet to be squeezed together toward the pin and re-locked into a position that provides a smooth lead-in for re-insertion into an opening of a component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener assembly comprising:
   a pin including at least one locking member or at least one reciprocal retaining feature; and
   a grommet including the other of the at least one locking member or the at least one reciprocal retaining feature,
   wherein the at least one locking member is configured to be securely retained by the at least one reciprocal retaining feature in a locked state in which the fastener assembly is configured to be inserted into an opening formed through a component, and wherein the at least one locking member is removed from the at least one reciprocal retaining feature in a securing state in which the fastener assembly is secured within the opening formed through the component,
   wherein the at least one locking member comprises a column including at least one projection and having a T-shaped axial cross section.

2. The fastener assembly of claim 1, wherein the at least one locking member further comprises at least one locking protuberance extending from a planar wall.

3. The fastener assembly of claim 1, wherein the at least one reciprocal retaining feature comprises at least one notch, groove, or channel that is configured to snapably retain the at least one locking member.

4. The fastener assembly of claim 1, wherein the grommet comprises a plurality of securing legs configured to outwardly expand in the securing state and pinch together in the locked state, and wherein each of the plurality of securing legs comprises the at least one locking member or the at least one reciprocal retaining feature.

5. The fastener assembly of claim 1, wherein the pin comprises the at least one locking member extending from a wall, wherein the at least one locking member includes at least one first locking protuberance and at least one second locking protuberance, wherein one of the at least one first locking protuberance and the at least one second locking protuberance comprises the column.

6. The fastener assembly of claim 5, wherein the at least one first locking protuberance is positioned to a first side of a central diametric plane of the pin, wherein the at least one second locking protuberance is positioned to a second side of the central diametric plane of the pin, and wherein the first side is opposite the second side.

7. The fastener assembly of claim 5, wherein at least a portion of the at least one first locking protuberance is positioned at a different level than an entirety of the at least one second locking protuberance.

8. A fastener assembly configured to be removably secured within an opening of a component, the fastener assembly comprising:
   a pin including a plurality of locking members; and
   a grommet including a plurality of reciprocal retaining features configured to snapably retain the plurality of the locking members in a locked state in which the fastener assembly is configured to be inserted into the opening of the component, and wherein the plurality of locking members are removed from the reciprocal retaining features in a securing state in which the fastener assembly is secured within the opening formed through the component,
   wherein at least one of the plurality of locking members comprises a column including at least one projection and having a T-shaped axial cross section.

9. The fastener assembly of claim 8, wherein at least one of the plurality of locking members comprises at least one locking protuberance extending from a planar wall.

10. The fastener assembly of claim 8, wherein each of the plurality of reciprocal retaining features comprises at least one notch, groove, or channel that is configured to snapably retain a respective one of the plurality of locking members.

11. The fastener assembly of claim 8, wherein the grommet comprises a plurality of securing legs configured to outwardly expand in the securing state and pinch together in the locked state, and wherein one of the plurality of reciprocal retaining features is formed on one of the plurality of securing legs.

12. The fastener assembly of claim 8, wherein the pin comprises a wall that includes at least two of the plurality of locking members, wherein the at least two of the plurality of locking members comprises at least one first locking protuberance and at least one second locking protuberance.

13. The fastener assembly of claim 12, wherein the at least one first locking protuberance is positioned to a first side of a central diametric plane of the pin, wherein the at least one second locking protuberance is positioned to a second side of the central diametric plane of the pin, and wherein the first side is opposite the second side.

14. The fastener assembly of claim 12, wherein at least a portion of the at least one first locking protuberance is positioned at a different level than an entirety of the at least one second locking protuberance.

15. A fastener assembly configured to be removably secured within an opening of a component, the fastener assembly comprising:
   a pin including first and second locking protuberances extending from a planar wall and first and second columns positioned with respect to opposite sides of the planar wall, wherein each of the first and second columns includes first and second projections, respectively; and
   a grommet including a plurality of securing legs, wherein each of the plurality of securing legs includes a reciprocal retaining feature configured to snapably retain one of the first locking protuberance, the second locking protuberance, the first projection, or the second projection in a compact locked state in which the fastener assembly is configured to be inserted into the opening of the component, wherein each of the plurality of reciprocal retaining features comprises at least one notch, groove, or channel that is configured to snapably retain a respective one of the first locking protuberance, the second locking protuberance, the first projection or the second projection, and wherein the first and second locking protuberances and the first and second projections are removed from the reciprocal retaining features in an expanded securing state in which the fastener assembly is secured within the opening formed through the component.

16. The fastener assembly of claim 15, wherein the first locking protuberance is positioned to a first side of a central diametric plane of the pin, wherein the second locking protuberance is positioned to a second side of the central diametric plane of the pin, wherein the first side is opposite the second side.

17. The fastener assembly of claim 15, wherein axial cross-sections of the first and second columns are T-shaped.

18. The fastener assembly of claim 15, wherein the plurality of securing legs are configured to outwardly expand in the expanded securing state and pinch together in the locked state.

19. The fastener assembly of claim 15, wherein at least a portion of the first locking protuberance is positioned at a different level than an entirety of the second locking protuberance.

20. The fastener assembly of claim 15, wherein a first portion of the first locking protuberance is positioned at a different level than a second portion of the second locking protuberance.

\* \* \* \* \*